Aug. 29, 1961

R. J. S. BROWN ET AL 2,998,565

SWITCHING CIRCUIT

Filed March 31, 1958

INVENTORS
ROBERT J. S. BROWN
PHILIP S. JASTRAM

BY *Frank E. Johnston*
*George W. Wasson*
ATTORNEYS

United States Patent Office 2,998,565
Patented Aug. 29, 1961

2,998,565
SWITCHING CIRCUIT
Robert J. S. Brown, Fullerton, Calif., and Philip S. Jastram, Columbus, Ohio, assignors to California Research Corporation, San Francisco, Calif., a corporation of Delaware
Filed Mar. 31, 1958, Ser. No. 725,311
3 Claims. (Cl. 324—.5)

This invention relates to a switching circuit and more particularly to a uni-directional conduction path shunting a high inductance load in series with a switch and providing a circuit for the elimination of sparking across the contacts of the switch.

It has been found that the nuclei of paramagnetic materials possess magnetic moments or spin and from this discovery a new technique for identification of elements displaying this phenomenon has evolved. Through the use of this phenomenon by measurements of nuclear magnetic induction, the presence of certain elements may be detected within a sample so as to give both a qualitative and quantitative analysis without destruction of the sample. In several copending applications assigned to the assignee of the present application the use of these techniques in the art of well logging has been suggested and especially so for the location of petroleum crudes within an earth formation.

In the application of the techniques of nuclear magnetic induction to the art of well logging, the spinning nuclei of certain atomic particles within an earth formation, particularly the hydrogen atom, are oriented so that the axis of spin of these nuclei is aligned with an intense polarization field. After a preselected period of polarization during which time the above orientation has taken place and more of the affected nuclei have been aligned with the polarization field than are aligned against the field, the polarization field is removed and the spinning nuclei are permitted to resume their random orientations. This return to random orientation is initiated by the effect of the earth's magnetic field on the spinning nuclei and is in the manner of a precessing gyroscope. Initially a majority of these precessing nuclei will precess alike or in phase so that an induced signal may be detected from these rotating particles because of the additive nature of the individual signals. Gradually, because of inhomogeneities in the precession causing force and through collision with other precessing nuclei, the induced signal will become reduced with the time and pattern for reduction being dependent upon the atomic origin of the nuclei and conditions within the earth formation being logged. The period for reduction in this precession signal is identified as the thermal relaxation time of a precessing nuclei and may be used to identify the structure of the nucleus from which it originates and, in that manner, the presence of certain constituents within an earth formation. This period may be extremely short or may extend for a longer measurable period depending upon the nuclei being analyzed and other parameters within the well. Experiments have shown the period may extend from the order of one millisecond to several minutes.

It is essential for the purposes of these measurements that signals may be derived from the precessing protons substantially instantaneously after their polarization and during the period they are precessing into their random orientation and, for the purposes of producing the best of precession signals, it is desirable that the polarization field be rapidly dissipated so that precession may begin sharply rather than in a gradual manner.

The conventional apparatus employed to electromagnetically establish a polarization field involves a highly inductive load and a direct current energization. Inherent in such apparatus is the self-induced current that is generated by the collapse of the magnetic field in the inductive load upon the termination of the direct current energization, the collapse of this magnetic field around the inductance normally tending to sustain current flow in the direction of initial energization through the contacts of a switch circuit employed to control the energization current. This sustained current may cause a damped termination of current flow and polarization field thus causing a damped period in which the precession cannot begin. Furthermore, this sustained current of self-induction can cause serious damage to the control switch through arcing at its contacts.

To overcome the foregoing difficulties, the present invention discloses an electrical circuit including an electronic valve shunting the highly inductive portions of the polarization circuit. This electrical circuit is connected so that the electronic valve is nonconductive during the period of polarization and is rendered conductive by a feedback voltage established by self-induction and, when energized, provides a low resistance current path around the high inductance load for the currents genrated by the collapse of the magnetic field of polarization. The self-induced currents are then rapidly dissipated through the electrical circuit so that the precession of the atomic particles may begin sharply. This rapid dissipation also facilitates the use of the polarization coil as a detector coil for the reception of induced precession signals as soon as precession begins.

It is therefore an object of the present invention to provide a discharge path in shunt with a high inductance load whereby self-induced currents from within the load may be dissipated upon the termination of energization of said load.

A further object of the present invention is the provision of a simplified uni-directional conduction path around a high inductance load employing an electronic valve whereby self-induced currents from within the inductive load may be rapidly dissipated upon de-energization of the load while providing a high impedance circuit during energization of the load.

Further objects and features of the present invention will be readily apparent to those skilled in the art from the specification and appended drawings illustrating a certain preferred embodiment, in which.

Figure 1:
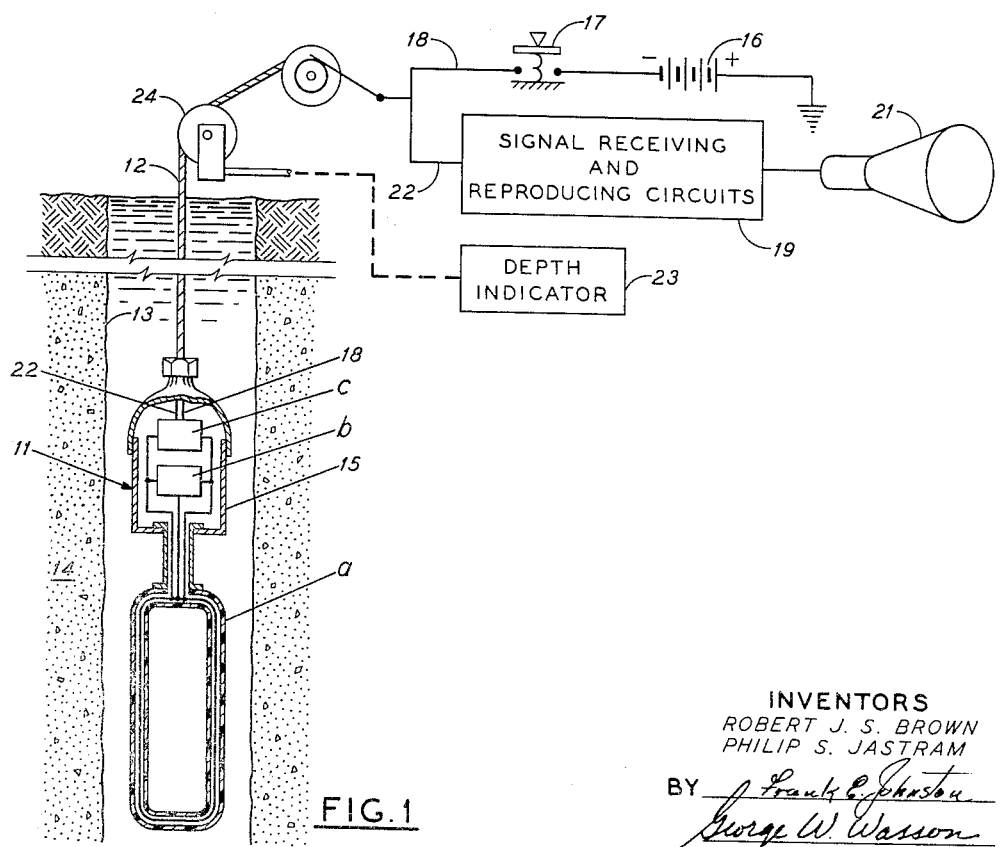
FIG. 1 is a block diagram partially in schematic form illustrating the association of the circuit of the present invention with a nuclear magnetism well logging tool.

In FIG. 1 a logging sonde 11 is illustrated suspended on a cable 12 within a well bore 13 penetrating an earth formation 14. The sonde incorporates a polarization coil section designated *a*, a discharge path section designated *b*, and a switching circuit designated *c*. Components *b* and *c* are supported within the housing 15 of the logging sonde 11 and the polarizing coil of section *a* is supported below the housing 15 within the well bore.

Cable 12 not only supports the sonde 11 but also provides the necessary electrical conductors interconnecting the downhole components of the sonde 11 with the uphole energization and signal reproducing circuits constituting a battery 16 with associated switch 17 for the energization of the polarizing coil through conductor 18 and a signal receiving and recording circuit 19 connected to and driving a reproducing device such as a cathode ray oscilloscope 21 connected to the downhole component through conductor 22. A depth indicator 23 is mechanically driven from a spool 24 over which the cable 12 passes as the sonde is raised and lowered within the well bore.

Figure 2:
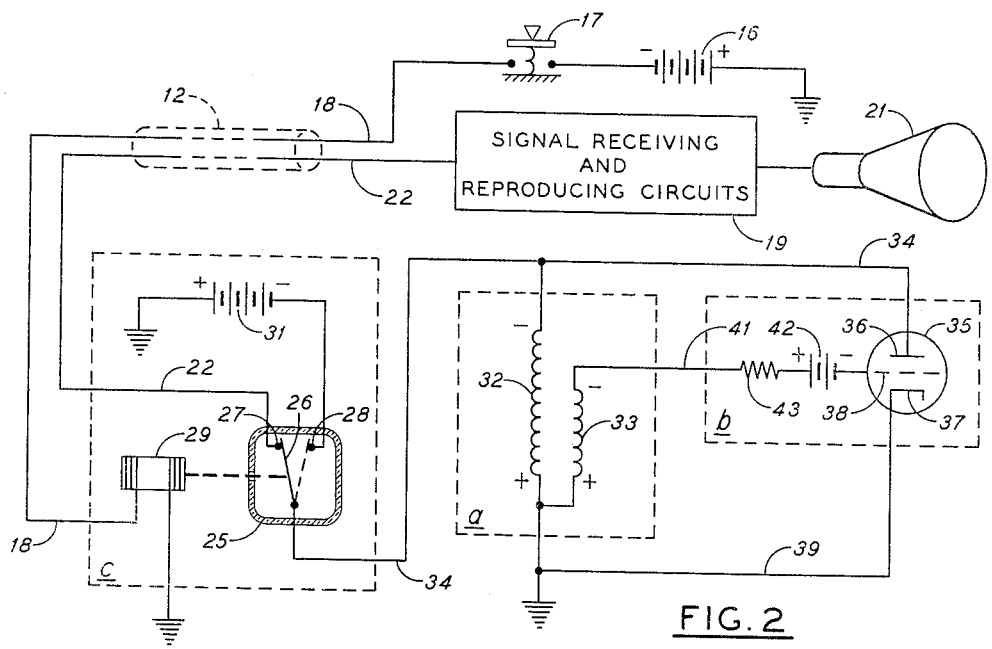
FIG. 2 is a schematic diagram illustrating the circuit of the present invention.

FIG. 2 is a schematic illustration of the energization and detection circuits of the logging sonde of the present invention including the discharge circuit for dissipating the self-induced currents from the polarizing coil. The components a, b and c so designated in FIG. 1 are enclosed with the dotted line portions of FIG. 2 and are similarly identified.

The switching portion c constitutes a vacuum switch 25 having a movable contact blade 26 and stationary contacts 27 and 28 with a mechanical drive from solenoid 29 actuated through conductor 18 from the battery 16 and switch 17 in the uphole components as illustrated in FIG. 1. The switching circuit c also includes a battery 31 connected to contact 28, for connection through movable contact 26 to the polarization coil to provide the energization for polarization of the atomic particles within the earth formation.

The polarization coil section a includes the polarization coil 32 and an inductively coupled second coil 33. Coil 33 is so positioned with respect to the polarization coil 32 as to be energized in the same polarity as the polarization coil 32 and is connected to the vacuum switch 25 through conductor 34.

The discharge circuit designated b constitutes an electronic valve or vacuum tube 35 having an anode 36, a cathode 37 and a control grid 38. The vacuum tube 35 is energized with its anode 36 connected to the upper end of the polarization coil by conductor 34, as shown in FIG. 2, while its cathode is connected to the opposite end of the polarization coil by conductor 39. The control grid 38 of the tube 35 is connected to the second coil 33 through conductor 41 with a battery 42 and a current limiting resistor 43 in circuit therewith.

The operation of the apparatus of the present invention for both polarizing and detecting nuclear magnetism signals is as follows: Upon the closure of switch 17, the battery 16 is connected to the solenoid 19 to move the movable contact 26 into the dotted position as shown in FIG. 2. In this position the polarization coil 32 is connected to battery 31 through conductor 34 and the common ground circuit so as to establish the magnetic flux necessary for polarization of atomic particles to provide the desired orientation within the earth formation. The polarity of the voltage drop across the polarization coil 32 is such that the upper end of the coil, as shown in FIG. 2, will be negative with respect to the lower end so that the vacuum tube 35, being connected across the polarization coil, will be energized with its anode 36 maintained negative by the voltage drop across the polarization coil and the cathode maintained positive with respect thereto. The vacuum tube 35 is therefore non-conductive.

Upon the opening of switch 17 to deenergize the solenoid 29, the contact blade 26 will be moved from the energization position in engagement with contact 28 and into the detection position in engagement with contact 27. This interruption of the current flow from battery 31 will initiate the collapse of the magnetic lines of force established around the polarization coil 32 to generate a voltage of self-induction within the coil having a tendency to sustain current flowing in its original direction. Under this condition the upper end of the coil, as shown in FIG. 2, will become positive with respect to the lower end of the coil and the anode 36 of vacuum tube 35 will then become positive with respect to the cathode 37. At the same time, the collapsing lines of force will generate a voltage in the inductively coupled coil 33 that will have the same polarity as the voltage across the polarization coil 32 so that the upper end of coil 33 will become positive with respect to the lower end, and the control grid 38 will then have applied thereto the voltage generated in the coil 33 as well as the voltage of battery 42. At the instant that the switch 25 is opened the collapse of the lines of force will be extremely rapid and the voltage generated in the coil 33 will far exceed the voltage of the battery 42, so that the control grid 38 of the vacuum tube 35 will be strongly driven in a positive polarity, thus allowing the vacuum tube 35 to become conductive and, with a relatively high voltage on the anode 36 and a positive potential on the control grid 38, the vacuum tube will provide an extremely low resistance conduction path around the polarization coil 32. This low resistance path will quickly dissipate the self-induced currents within the polarization coil.

As the magnetic field continues to collapse around the coil 32, the voltage generated in the coil 33 will become reduced and eventually the battery 32 will resume control of the conduction through the vacuum tube as the anode to cathode voltage of the vacuum tube 35 are also reduced. This collapse of the magnetic lines of force and the dissipation of the self-induced currents is effected within a reasonably short period of time and the coil 32 is then prepared for the detection of signals from the precessing protons. These signals detected by the coil 32 are then transmitted to the signal receiving and reproducing circuits 19 and the oscilloscope 21 through conductor 22.

The rapid dissipation of the polarization field through the low resistance electronic circuit energized by self-induced voltage and keyed by the feedback grid circuit allows the precession to begin very shortly after the atomic particles have been polarized. While the dissipation is rapid and the currents are high, the electronic circuit is capable of handling the high current and, when the valve is finally cut off by the removal of the positive grid voltage, the voltages then applied across the contacts of switch 25 are not sufficient to cause damage through arcing. In this manner the problem of rapid removal of the polarization field has been simply and economically solved.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a nuclear magnetism well logging tool a direct current source, a switch having separable contacts, a polarization coil, said coil adapted to be suspended within a well bore penetrating an earth formation and to be energized from said source through said switch to polarize atomic particles within the earth formation penetrated by said well bore, said switch also being adapted to connect said coil for detecting signals from polarized atomic particles substantially instantly after said coil has been connected for polarization, a uni-directional circuit means connected across said polarization coil, a second coil inductively coupled to said polarization coil, circuit means for energizing said uni-directional means to provide a conduction path for self-induced currents generated in said polarizing coil upon interruption of current from said source when said contacts are separated, and said second coil being connected to said uni-directional circuit means to terminate current flow through said uni-directional circuit means when said self-induced currents are reduced.

2. In a nuclear magnetism well logging tool adapted to be supported within a well bore penetrating an earth formation, a first source of direct current, a polarization coil, a switch having separable contacts connected between said direct current source and said polarization coil, said polarization coil being adapted to be energized through said contacts to polarize atomic particles within said earth formation adjacent to said well bore, an electronic valve having a cathode, an anode and a control electrode, circuit means connecting the cathode and anode of said valve in shunt across said polarization coil and in series with said source and said switch, a second coil inductively coupled to said polarization coil and connected in shunt across said control electrode and cathode of said valve, and a second source connected in series with said second coil and to said cathode and control electrode of said valve in a polarity to normally prevent current flow through said valve, said switch means also being adapted to connect said polarization coil for the detection of signals from polarized atomic particles within said earth formation, whereby upon separation of said contacts terminating current flow through said polarization coil from said first source said electronic valve means is energized to dissipate currents generated within said polarization coil by self-induction and said second coil is energized to cancel said bias of said second source to render said valve means conductive, and when said energization of said second coil is reduced as said self-induced currents are reduced, said bias of said second source eventually exceeds said energization to terminate conduction through said electronic valve, said polarization coil then being connected for detection of said signals.

3. For use in a nuclear magnetism logging tool having a single coil for polarizing nuclei within an earth formation and for detecting signals derived from the precession of said nuclei so polarized upon termination of polarization current through said coil, a discharge path for currents self-induced in said coil upon interruption of said polarizing current, said path being in shunt with said coil and controllable by said self-induced currents to rapidly dissipate said self-induced currents, said path including a vacuum tube having an anode connected to one end of said coil, a cathode connected to the other end of said coil, a control electrode connected to said other end of said coil through a source of direct current voltage and an inductance inductively coupled to said coil, said direct current voltage being polarized to bias said vacuum tube into cut-off and said inductance being polarized so that a voltage induced therein by self-induced currents within said coil will oppose said direct current voltage and permit said vacuum tube to conduct current to provide a low resistance discharge path for said self-induced currents within said coil, said vacuum tube being conductive so long as said voltage induced in said inductance exceeds said direct current voltage whereby said coil is prepared to detect said precession signals substantially immediately after said nuclei have been polarized.

References Cited in the file of this patent
UNITED STATES PATENTS

| | | |
|---|---|---|
| 1,966,077 | Nyman | July 10, 1934 |
| 2,546,818 | Curtis | Mar. 27, 1951 |
| 2,612,629 | Alexanderson et al. | Sept. 30, 1952 |
| 2,637,769 | Walker | May 5, 1953 |

FOREIGN PATENTS

| | | |
|---|---|---|
| 728,775 | France | Apr. 18, 1932 |
| 642,784 | Germany | Mar. 16, 1937 |

OTHER REFERENCES

Varian, German application 1,015,954, printed Sept. 19, 1957 (KL 21g)—(5 pp. spec., 3 shts. dwg.).